Figure 1:
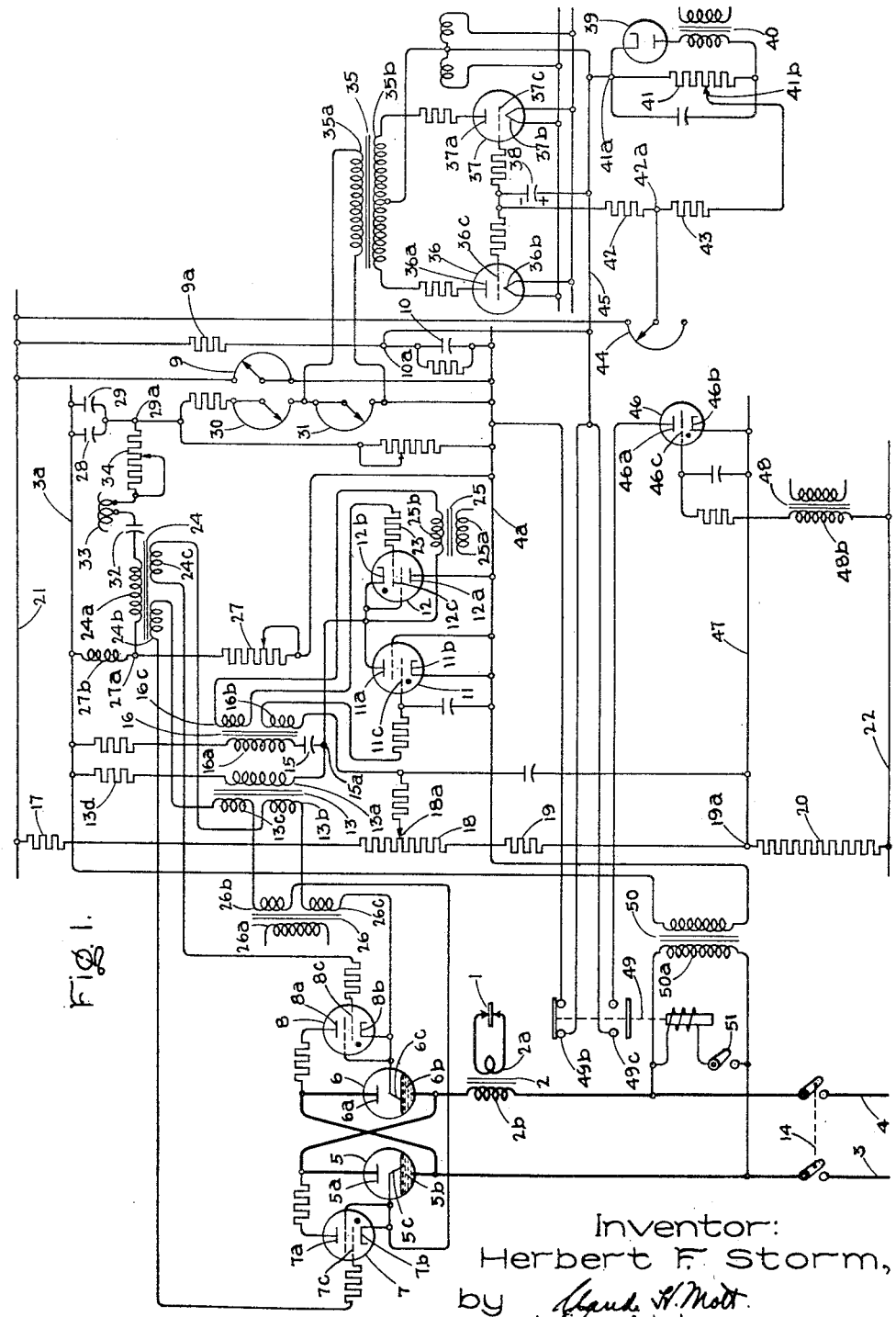

Inventor:
Herbert F. Storm,
by Frank H. Mott
His Attorney.

Dec. 5, 1950  H. F. STORM  2,532,825
WELDING CONTROL SYSTEM
Filed July 21, 1949  2 Sheets-Sheet 2
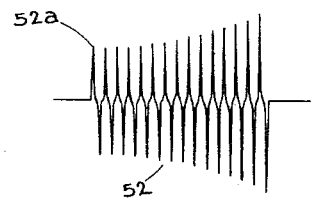
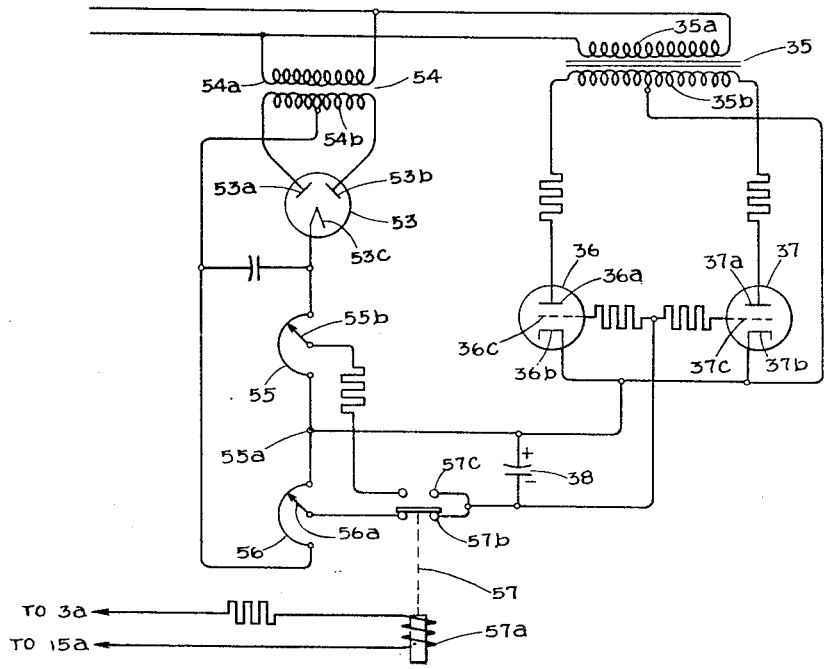
Inventor:
Herbert F. Storm,
by Claude H. Mott.
His Attorney Patented Dec. 5, 1950

2,532,825

UNITED STATES PATENT OFFICE 2,532,825

WELDING CONTROL SYSTEM

Herbert F. Storm, Schenectady, N. Y., assignor to General Electric Company, a corporation of New York Application July 21, 1949, Serial No. 105,967

3 Claims. (Cl. 323—24)

This invention relates to welding control systems, more particularly to resistance welding control systems, and it has for an object the provision of a simple, reliable and inexpensive control system for improving the quality of a weld and for shortening the time required for its accomplishment.

Modern resistance spot welding and seam welding controls are usually provided with means for setting a fixed value for the intensity of the welding current and for maintaining the current at that value during the process of the weld. If the weld current and the electrical resistance of the weld remain constant during the weld, then the rate of generated heating of the weld, i. e. the B. t. u.'s generated per second in the weld remain constant. However, as the temperature of the weld rises, heat losses owing to conduction, convection and radiation increase. As a result the rate of temperature rise diminishes as the weld progresses and a longer "on" time is required for making the weld. This increase of the "on" time is undesirable for several reasons. It entails a waste of time, a waste of electrical energy and in addition it is likely that the quality of the weld will be impaired. It is possible in some cases that a condition of equilibrium is attained in which the total heat loss equals the rate of heat generation, in which case, if the equilibrium temperature is below the temperature of fusion, the weld will never be accomplished.

Actually the electrical weld resistance is not constant but decreases toward the end of the weld. Owing to the relatively high reactance of the welding circuit, the decrease in resistance has a negligible effect on the magnitude of the welding current. Consequently, the levelling off of the temperature described in the foregoing and its attendant undesirable effects are aggravated.

The disadvantages described in the foregoing are overcome by starting the weld at a low value of current which is sufficient to break down the impurities on the surface of the material being welded and then causing the welding current to rise to a higher value in a predetermined but adjustable number of cycles of the line voltage.

In carrying the invention into effect in one form thereof, alternating current is supplied from a source of alternating voltage through a pair of ignitrons to a welding load circuit in response to operation of an initiating switch. A phase shifting network including a heat control rheostat controls the firing point of the ignitrons to determine the magnitude of the current supplied to the welding circuit. A pair of electric valves, normally biased to cut-off, are connected to the phase shifting network and during a welding operation they control the phase shifting network to progressively advance the firing point of the ignitrons in successive half cycles of anode voltage in response to an automatically increasing positive bias, thereby to cause the magnitude of the welding current to increase at a predetermined rate during the weld.

For a better and more complete understanding of the invention, reference should now be had to the following specification and to the accompanying drawing, of which Fig. 1 is a simple diagrammatical sketch of an embodiment of the invention; Fig. 2 is a characteristic curve which facilitates an understanding of the invention, and Fig. 3 is a modification.

Referring now to the drawing, a welding load 1 is connected in a series circuit with the secondary winding 2a of a welding transformer 2 of which the primary winding 2b is arranged to be connected across the A.-C. supply conductors 3 and 4 through a pair of reverse parallel connected ignitron valves 5 and 6 when the switch 14 is closed. These ignitron valves have anodes 5a and 6a, mercury pool cathodes 5b and 6b and igniter electrodes 5c and 6c, respectively.

The firing of the ignitron valves is controlled by means of a pair of firing valves 7 and 8 which are preferably shield grid thyratrons of the FG-95 type. They control the supply of ignition current to the ignitors at the proper point in the positive half cycles of anode voltage to cause current of the desired average value to be supplied through the ignitrons to the welding transformer. As shown, the thyratrons have anodes 7a and 8a, cathodes 7b and 8b, and control grids 7c and 8c, respectively. Control of the precise instant of firing of the ignitrons in each positive half cycle of the anode voltage is provided by control of the voltages supplied to the control grids 7c and 8c of the firing valves.

For the purpose of controlling the length of weld, i. e. the number of full cycles of alternating voltage to be supplied to the welding load circuit, a timer is provided for supplying to the control circuit of the firing valves a selected number of cycles of alternating voltage equal to the number of cycles of alternating current to be supplied to the welding load during the weld period. This timer is illustrated as a resistance capacitance circuit comprising a rheostat 9 and a capacitor 10 and a pair of thyratron valves 11 and 12 controlled thereby. These valves are preferably FG-95 type screen grid thyratrons. They are provided with anodes 11a and 12a, cathodes 11b and 12b and control grids 11c and 12c, respectively. As shown, the thyratrons 11 and 12 are connected in reverse parallel with each other and through the primary winding 13a of a transformer 13 and a resistor 13d to the source of alternating voltage represented by the supply conductors 3 and 4 from which the ignitrons are supplied. Connected in parallel with the primary winding 13a and resistor 13d is a circuit which includes a capacitor 15 and the primary winding 16a of a transformer 16. The control grid 11c of thyratron 11 is connected through a secondary winding 16b of this transformer to an intermediate point on a voltage divider which comprises resistors 17, 18, 19 and 20 connected across a source of direct voltage such as the two supply conductors 21 and 22. A sliding contact 18a on the resistor 18 is provided for adjusting the voltage on the grid 11c to bias the valve 11 negatively beyond cut-off.

The control grid 12c is connected to its cathode through a resistor 23, a secondary winding 16c of transformer 16 and a secondary winding 25b of a transformer 25 of which the primary winding 25a is supplied from a suitable source such as the supply conductors 3 and 4. The secondary winding 25b furnishes an alternating hold-off bias voltage to the grid 12c which normally biases the valve 12 beyond cut-off. This hold-off bias voltage can be overcome by a turn-on voltage supplied to the grid by the secondary winding 16c. This turn-on voltage is induced in the secondary winding 16c by the pulsating current flowing in the primary winding 16a when the valve 11 is conducting. Thus, leading-trailing operation of valves 11 and 12 is provided since the valve 12 cannot fire unless the leading valve 11 has fired first.

The transformer 13 is provided with two secondary windings 13b and 13c which are respectively connected in the input or grid cathode circuits of the firing thyratrons 7 and 8. When the timer valves 11 and 12 are conducting, the secondary windings 13b and 13c furnish an alternating voltage to each of the control grids 7c and 8c of the firing thyratrons. These voltages are of the proper phase with respect to the voltages supplied to the anodes 7a and 8a to initiate conduction and are therefore referred to as the turn-on voltages.

Also connected in the input circuits of the firing valves in series with the turn-on secondary windings 13b and 13c are the secondary windings 24b and 24c of a peaking transformer 24 and the secondary windings 26b and 26c of a transformer 26 of which the primary winding 26a is supplied from the supply conductors 3 and 4. The transformer 24 is a peaking transformer, i. e. it is provided with a saturable core which causes the voltage induced in the secondary winding to have a steeply peaked wave form. In order that the peaking transformer may operate continuously without causing the firing thyratrons to conduct when the timer controlled or turn-on transformer 13 is unexcited, a hold-off bias voltage is supplied by the transformer 26 to the input circuit of each thyratron. This hold-off bias voltage is out of phase with the peaking voltage supplied by the peaking transformer and is of such magnitude that normally the grid of each firing thyratron is negatively biased to such an extent that the positive peaks of the voltage produced by the peaking transformer do not attain the critical value necessary to fire the thyratrons. However, when the timer supplies alternating voltage to the primary winding 13a of the turn-on transformer, the voltage induced in the secondary winding offsets the hold-off bias voltage and permits the positive peaks of the voltage supplied by the peaking transformer to raise the grid voltage above the critical value to initiate conduction in the firing thyratrons and to fire the ignitrons.

Shifting of the phase relationship of the peaked voltage with respect to the anode voltages of the firing thyratrons is employed to control the firing point of the ignitrons. If the ignitron is fired at the beginning of the positive half cycle of its anode voltage, it conducts the maximum average value of current. On the other hand, if the ignitron is fired late in the positive half cycle of anode voltage, it conducts a very low average value of current. For intermediate firing points the average current conducted by the ignitrons has corresponding intermediate values. Thus by shifting the phase relationship of the peaked voltage the current conducted by the ignitrons is varied as desired and the heat applied to the welding load is correspondingly varied.

For the purpose of shifting the phase of the peaked voltage with respect to the anode voltage of the firing thyratrons, the primary winding 24a of the peaking transformer is supplied from a phase shifting network. This network is illustrated as a bridge network supplied from the supply conductors 3 and 4. A winding 27b and a resistor 27 constitute two of the arms of the bridge; the parallel-connected capacitors 28 and 29 constitute the third arm and the series-connected rheostats 30 and 31 constitute the fourth arm. The primary winding 24a of the peaking transformer is connected in a tuned resonant circuit between the opposite bridge points 27a and 29a. This tuned resonant circuit comprises the primary winding 24a, the capacitor 32, reactor 33 and adjustable resistor 34. If the effective resistance of rheostat 31 is reduced, the phase of the peaked voltage induced in the secondary windings of the peaking transformer is advanced. This causes the firing thyratrons to become conducting earlier in the positive half cycle of anode voltage which in turn causes the ignitrons to fire earlier in the positive half cycle of anode voltage, thereby to increase the current supplied to the welding load. Since adjustment of the effective resistance of rheostat 31 controls the current conducted by the ignitrons and consequently controls the heat applied to the welding load, they are referred to as the heat control rheostats.

For the purpose of increasing the welding current from the starting value set on the rheostats 30 and 31 to the final value set on the full heat adjustment control rheostat 30, a special slope control is provided. It comprises a transformer 35 having its primary winding 35a connected across the heat control rheostat 31, a pair of electric valves 36 and 37 connected across the secondary winding 35b as a single phase diametric full wave rectifier, and a control circuit for controlling the rectifier. As shown, the anodes 36a and 37a of the valves 36 and 37 are respectively connected to opposite terminals of the secondary winding 35b and the cathodes 36b and 37b are connected to the center tap of the secondary winding. Although the valves 36 and 37 may be of any suitable type, they are preferably 2A3 high vacuum power valves.

Between the cathodes 36b and 37b and the grids 36c and 37c, is connected a capacitor 38 to which a direct voltage is supplied from a suitable source such as represented by the diode rectifier valve 39 which in turn is supplied from a suitable source of alternating voltage such as the supply conductors 3 and 4 to which it is connected through a transformer 40. A potentiometer 41 is connected across the output terminals of the rectifier. The cathode terminal of capacitor 38 is connected to the positive terminal 41a of the potentiometer and the grid terminal of the capacitor is connected through resistors 42 and 43 to the slider 41b of the potentiometer. Thus a charge is supplied to the capacitor 38 which is positive at the cathodes 36b and 37b and negative at the grids 36c and 37c. The magnitude of the negative bias on the grids may be adjusted as desired by adjusting the position of the slider 41b. A rheostat 44 is connected between the point 42a and the positive conductor 21 and the cathode terminal of capacitor 38 is connected to the terminal 10a of resistor 10 by means of conductor 45. Thus the bias capacitor 38 is connected across the resistor 9a.

An initiating valve 46 is connected between the point 10a and a conductor 47 which is connected to an intermediate point 19a on the voltage divider. Although the valve 46 may be of any suitable type it is preferably an FG17 thyratron. The grid 46c is connected through the secondary winding 48b of a peaking transformer to the negative supply conductor 22 and since the cathode 46b is connected to the more positive conductor 47, a direct negative bias voltage is supplied to the grid. Superimposed on this direct voltage is a peaked alternating voltage which is supplied by the peaking transformer 48. Thus a peaked alternating voltage is continuously applied to the grid 46c to provide synchronous firing.

In the inactive condition of the system, the normally open contacts 49c of an initiating contactor disconnect the anode 46a of the initiating valve from the point 10a and the normally closed contacts 49b complete a discharge circuit for the timing capacitor 10.

With the foregoing understanding of the elements and their organization, the operation of the system will readily be understood from the following detailed description.

The equipment is prepared for operation by closing the switch 14 to complete the connection of the ignitron welding circuit to the main supply conductors 3 and 4 and also to connect the primary winding 50a of the control voltage supply transformer 50 to the main supply conductors 3 and 4 so that voltage is supplied to the control voltage supply conductors 3a and 4a.

A welding operation is started by closing the initiating switch 51 to complete an energizing circuit for the operating coil 49a of contactor 49, which, in response to energization opens its normally closed contacts 49b to interrupt the discharge circuit and closes its normally open contacts 49c to complete the anode circuit of the initiating valve 46. Following the closing of contacts 49c, the arrival of the next positive voltage peak on the grid 46c will cause the initiating valve to fire. As a result the voltage at the point 10a will drop from its original value, which is substantially the voltage of conductor 21, to a much lower voltage approximately equal to the voltage at the conductor 47.

Owing to the coupling between point 10a and the conductor 4a provided by the timing capacitor 10, the voltage of the conductor 4a will follow the voltage at the point 10a since the capacitor 10 cannot charge instantaneously. As a result of the sudden drop in voltage of conductor 4a, the timing valve 11 will fire during the first positive half cycle of anode voltage and owing to the provision for trailing tube operation explained in the foregoing, the timing valve 12 will fire during the next succeeding half cycle. Consequently an alternating current flows in the primary winding 13a of the turn-on transformer and a turn-on voltage is induced in the secondary windings 13b and 13c which counteracts the turn-off voltages supplied by the secondary windings 26b and 26c. This permits the voltages supplied by the peaking transformer 24 to initiate conduction of the firing valves 7 and 8 which in turn fire the ignitrons 5 and 6 at a point in the positive half cycles of anode voltage that is determined by the adjustment of the heat control rheostats 30 and 31.

The current supplied by the ignitrons to the welding load during the first half cycle is represented by the ordinate 52a of the first positive half cycle of the sinusoidal curve 52 of Fig. 2.

Owing to the current flow through the rheostat 9 the capacitor 10 slowly charges so that the voltage of the conductor 4a slowly rises toward the value which existed prior to firing the iniating valve 46 in response to operation of the initiating switch. After a predetermined number of cycles, which is determined by the adjustment of rheostat 9, the voltage of conductor 4a will have become sufficiently positive to prevent the timing valve 11 from firing again and the welding operation is finished. As indicated by the curve 52, the welding operation illustrated is terminated after fifteen complete cycles of alternating voltage have been supplied to the welding circuit load.

The sudden drop in voltage of the point 10a resulting from the firing of the initiating valve causes a voltage to be applied to the bias capacitor 38 of reverse polarity with respect to the polarity of the charge supplied by the rectifier valve 39. Consequently the capacitor 38 begins to discharge and to recharge to the opposite polarity. As the discharge proceeds the voltage at the grids 36c and 37c becomes progressively less negative thereby progressively increasing the current flowing in the secondary winding 35b. This has the effect of progressively decreasing the apparent resistance across the primary winding with the result that the phase of the voltage peaks supplied by the peaking transformer 24 to the grids 7c and 8c of the firing thyratrons is gradually advanced so that the ignitrons are fired progressively earlier in successive cycles and therefore supply alternating current of progressively increasing magnitude to the welding circuit load as represented graphically by the curve 52.

By adjusting the rheostat 44, the positive bias voltage supplied to the grids 36c and 37c can be adjusted to a desired maximum value and the maximum value of the welding current correspondingly adjusted.

If it is desired to have the current rise begin immediately after the start of the weld, the valves 36 and 37 should be biased close to cut-off. It will be noted, however, that by varying the heat control rheostats 30 and 31, the voltage across the primary winding 35a is correspondingly varied. In order to maintain valves 36 and 37 close to cut-off, the applied negative hold-off bias must be adjusted by adjustment of the slider 41b on potentiometer 41.

A further modification of the invention comprises the provision of means for automatically adjusting the negative bias to correspond with changes in the anode supply voltage, as illustrated in Fig. 3. In this modification, as in Fig. 1, the rise control valves 36 and 37 are supplied from the secondary winding 35b of a transformer 35, of which the primary winding 35a is connected across the heat control rheostat 31. The bias control capacitor 38 is supplied from a single phase diametric rectifier, which is illustrated as comprising a double diode valve 53 having its anodes 53a and 53b connected across the terminals of the secondary 54b of a transformer 54 of which the primary winding 54a is connected across the heat control rheostat 31. Two potentiometers 55 and 56 are connected in series in the load circuit between the cathode 53c and the center tap of the secondary winding 54b.

The upper terminal of the bias control capacitor is connected to the common point 55a between the two potentiometers 55 and 56 and the lower terminal of the capacitor is connected to the slider 56a of potentiometer 56 through the normally closed contacts 57b of a relay 57 of which the operating coil 57a is connected across the primary winding 13a of the primary winding in the output circuit of the timing valves 11 and 12, i. e. it is connected across the conductor 3a and the point 15a. When the timing valves are non-conducting, the relay 57 is deenergized and its contacts 57b are closed. Thus the bias control capacitor is connected in parallel with the active portion of the potentiometer 56 between the slider 56a and the upper terminal and receives a charge which is positive at the upper or cathode terminal and negative at the lower or grid terminal. The slider 56a may be adjusted so that the valves 36 and 37 are biased just beyond cut-off.

In operation the charge on the capacitor 38 varies with changes in the adjustment of the heat control rheostats 30 and 31 and consequently the valves 36 and 37 remain close to the threshold of cut-off throughout a wide variation of the heat control rheostats.

In response to conduction by the timing valves, the relay 57 picks up and opens its normally closed contacts 57b to disconnect the negative terminal of capacitor 38 from the slider 55a and closes its normally open contacts 57c to connect the negative terminal to the slider 55b of potentiometer 55. As a result of this connection the capacitor 38 is discharged and recharged to the reverse polarity, and the current supplied by the ignitrons to the welding circuit load increased in a manner identical with that described in connection with the modification of Fig. 1.

Although in accordance with the provisions of the Patent Statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A welding control system comprising a source of alternating voltage, a pair of ignitrons for supplying alternating current from said source to a welding load circuit, an initiating switch and a first electric valve controlled thereby for initiating the firing of said ignitrons, a phase shifting circuit energized from said source including a heat control rheostat for presetting an initial firing point of said ignitrons in a positive half cycle of alternating voltage, a transformer having its primary winding connected across said rheostat, a rectifier connected to the opposite terminals of the secondary winding of said transformer, said rectifier comprising a pair of electric valves each having an anode, a cathode and a control grid, a capacitor connected between said cathodes and grids, a source of direct voltage for supplying a voltage to said capacitor to apply negative bias voltages to said grids, means for adjusting said bias voltages to bias said rectifier valves to cut-off, a charging circuit for said capacitor closed in response to operation of said initiating switch for supplying a voltage of opposite polarity and increasing magnitude to said capacitor to cause said rectifier valves to fire progressively earlier in successive half cycles thereby progressively to reduce the apparent resistance of said primary winding, the reduction of said apparent resistance serving progressively to advance the firing of said ignitrons in successive half cycles and increase the current supplied to the welding load circuit.

2. A welding control system comprising a source of alternating voltage, a pair of ignitrons for suppling alternating current from said source to a welding load circuit, a switch for initiating the firing of said ignitrons to supply a welding current to said load circuit, a phase shifting circuit energized from said source and including a heat control rheostat for presetting the firing point of said ignitrons in the initial cycle of said welding current, a first transformer having its primary winding connected across said rheostat, a pair of electric valves connected across the secondary winding of said transformer each provided with an anode, a cathode and a control grid, a capacitor connected between said cathodes and grids, a source of direct voltage comprising a second transformer having its primary winding connected across said rheostat and a rectifier supplied from said transformer, connections from said rectifier to said capacitor for charging said capacitor to cause a negative bias voltage to be supplied to said grids proportional in magnitude to the voltage across said rheostat to bias said valves to cut-off, and switching mechanism responsive to operation of said initiating switch for reversing the connections between said capacitor and said source of direct voltage to apply a progressively increasing positive bias to said grids to cause said valves to fire progressively earlier in successive half cycles thereby to progressively reduce the apparent resistance of the primary winding of said first transformer, the reduction of said apparent resistance serving progressively to advance the firing point of said ignitrons in successive half cycles to effect a corresponding increase of said welding current in successive half cycles.

3. A welding control system comprising in combination, a source of alternating voltage, a pair of ignitrons for supplying alternating current from said source to a welding load circuit, each of said ignitrons being provided with a firing circuit, a switch and a first electric valve controlled thereby for initiating the firing of said ignitrons to start the supply of welding current, a phase shifting bridge network energized from said source and having as one of its arms a heat control rheostat for presetting the firing point of said ignitrons in the initial cycle of said welding current, a timer for controlling the duration of said welding current comprising a resistance capacitance timing circuit completed in response to operation of said initiating switch, a pair of electric valves rendered conductive in response to completion of said timing circuit each having a pair of discharge supporting electrodes and a control grid, a first transformer having its primary winding connected in circuit with said discharge electrodes and a separate secondary winding connected to each of said firing circuits, a second transformer having its primary winding connected across said heat control rheostat, a pair of control electric valves connected across the secondary winding of said second transformer each provided with an anode, a cathode and a control grid, a capacitor connected between said cathodes and grids, a source of direct voltage for charging said capacitor to cause a negative voltage to be supplied to said grids to bias said control valves to cut-off, a relay connected to operate in response to the voltage across the primary winding of said first transformer and switching mechanism responsive to operation of said relay for reversing the connections between said capacitor and said source of direct voltage for the duration of said welding current to apply a progressively increasing positive bias to the grids of said control valves to cause said control valves to fire progressively earlier in succeeding half cycles thereby to progressively reduce the apparent resistance of the primary winding of said second transformer, the reduction of said apparent resistance serving progressively to advance the firing point of said ignitrons in successive half cycles to effect a corresponding increase of said welding current in successive half cycles.

HERBERT F. STORM.

No references cited.